United States Patent
Imai

[19]

[11] Patent Number: 6,145,889
[45] Date of Patent: Nov. 14, 2000

[54] ROTARY JOINT

[75] Inventor: Hiroshi Imai, Saitama, Japan

[73] Assignee: Surpass Industry Co., LTD, Saitama, Japan

[21] Appl. No.: 09/309,590

[22] Filed: May 11, 1999

[30] Foreign Application Priority Data

Jan. 13, 1999 [JP] Japan ................... 11-007043

[51] Int. Cl.$^7$ .................................. F16L 17/035
[52] U.S. Cl. .................. 285/98; 285/111; 285/276; 285/351; 285/382; 285/422; 285/906
[58] Field of Search ................... 285/276, 906, 285/111, 98, 351, 382, 422

[56] References Cited

U.S. PATENT DOCUMENTS

| | | | |
|---|---|---|---|
| 1,874,397 | 8/1932 | Webb | 285/906 |
| 2,507,849 | 5/1950 | Bland | 285/276 |
| 2,698,192 | 12/1954 | Bily | 285/276 |
| 3,446,245 | 5/1969 | Snyder | 285/276 |
| 3,558,163 | 1/1971 | Moore et al. | 285/276 |

*Primary Examiner*—Dave W. Arola
*Attorney, Agent, or Firm*—Browdy and Neimark

[57] ABSTRACT

A rotary joint comprises: a joint main body constructed of a casing (1) and a housing (3); and, a rotary body (8) inserted in the joint main body and rotatably mounted therein. In the joint: a part of an outer peripheral surface of the rotary body (8) serves as a corresponding inner race of a sliding bearing; and, the sliding bearing rotatably supports the rotary body (8), and constructed of the corresponding inner race (11) and a corresponding outer race (10) incorporated in the housing (3). The sliding bearing (10, 11) may be constructed of: a plurality of units of thin-width sliding bearings; or, a single unit of a thick-width sliding bearing. A pin (12) is pounded into the joint and engaged with both the outer race (10) and the housing (3), whereby the outer race (10) is prevented from rotating in operation.

6 Claims, 2 Drawing Sheets

ROTARY JOINT

BACKGROUND OF THE INVENTION

1. Field of the Invention

The present invention relates to a rotary joint, and more particularly to a rotary joint connected with a rotary element of various types of machines, for example such as machine tools, processing machines, washing machines and like machines to supply fluid such as chemical liquids, processing liquids, washing liquids and like liquids and gases to the machine through its rotary element.

2. Description of the Related Art

In general, as shown in FIG. 3, a conventional rotary joint is provided with a joint main body. This joint main body is constructed of a casing 21 and a housing 22. Rotatably mounted in this joint main body which remains stationary in operation is a rotary body 23. This rotary body 23 is connected with a corresponding rotary element of various types of machines and instruments through bearings 24. In construction, a fluid passage 25 is formed in the casing 21 and communicated with a corresponding fluid passage 26 of the rotary body 23 to permit a fluid to pass through the rotary joint.

As shown in FIG. 3, in general, a radial ball bearing is used as each of the bearings 24 for rotatably supporting the rotary body 23. In assembly operations, the ball bearing 24 has its inner race fitted to the rotary body 23, and then has its outer race fitted in the housing 22. As shown in FIG. 4, in place of the ball bearing 24, a ball-less bearing such as sliding bearings and like bearings may be used. Such ball-less bearing is constructed of an inner ring (hereinafter referred to as the inner race) 27 and an outer ring (hereinafter referred to as the outer race) 28, and often used in industry. In assembly operations, the ball-less bearing has its inner race 27 fitted to the rotary body 23, and then has its outer race 28 fitted in the housing 22, as is in the ball bearing 24.

Problems to be solved by the present invention are as follows: namely,

As described in the above, in the conventional rotary joint, the rotary body is rotatably supported by the radial ball bearings or the ball-less bearings. In either case, it is necessary for the bearing to perform its assembly operations, in which the bearing has its inner race fitted to the rotary body while its outer race fitted in the housing. However, such assembly operations of the conventional bearing take too much time and labor due to the presence of the fitting operations of the inner race and the outer race of the bearing to the rotary body and the housing of the rotary joint, respectively.

SUMMARY OF THE INVENTION

Consequently, it is an object of the present invention to provide a rotary joint, which is low in its component count and easy in assembly operations thereof, thereby solvng the problems in herent in the conventional rotary joint.

The above object of the present invention is accomplished by providing:

In a rotary joint comprising:
a joint main body constructed of a casing and a housing; and
a rotary body inserted in the joint main body and rotatably mounted therein; the improvement wherein:
a part of a peripheral surface of the rotary body serves as a corresponding inner race of a sliding bearing; and
the sliding bearing rotatably supports the rotary body, and constructed of the corresponding inner race and a corresponding outer race incorporated in the housing.

In the rotary joint of the present invention having the above construction, preferably the sliding bearing is constructed of a plurality of units of thin-width sliding bearings.

The sliding bearing may be constructed of a single unit of a thick-width sliding bearing.

Preferably, a pin is pounded into the rotary joint of the present invention, and engaged with both the outer race and the housing, whereby the outer race is prevented from rotating in operation.

DESCRIPTION OF THE PREFERRED EMBODIMENTS

Hereinbelow, the present invention will be described in detail with reference to the accompanying drawings.

Figure 1:
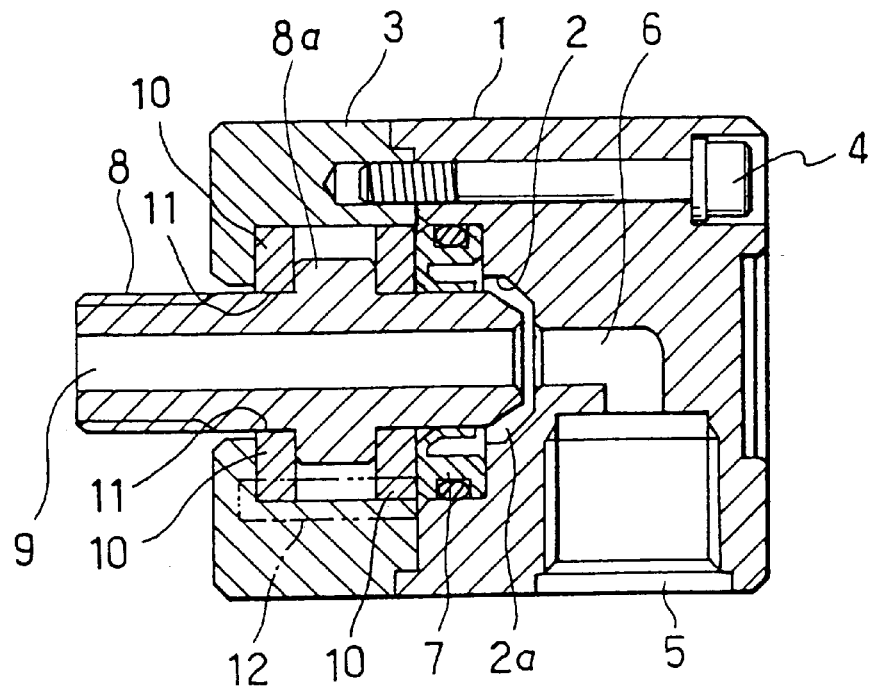
FIG. 1 is a longitudinal sectional view of a first embodiment of a rotary joint of the present invention.

FIG. 1 is a longitudinal sectional view of a first embodiment of a rotary joint of the present invention, in which: the reference numeral 1 denotes a casing provided with a central concave portion 2 in its axially inner end surface; and, the reference numeral 3 denotes a housing fixedly mounted on the axially inner end surface of the casing 1 through at least one bolt 4. The casing 1 and the housing 3 combine to form a joint main body of the rotary joint of the present invention.

Formed in the casing 1 is a port 5 which serves as an inlet and outlet port of fluid such as gases and the like. A fluid passage 6 is formed in the casing 1 and extends from the port 5 to open to the concave portion 2. A lip packing 7 made of fluorine plastics and the like is fitted to an inner surface of the concave portion 2 of the casing 1.

A rotary body 8 is inserted in the joint main body. The rotary body 8 is preferably made of ceramics or fluorine plastics, which are excellent in resistance to chemicals. Formed in the rotary body 8 is a longitudinal fluid passage 9 which axially extends along the length of the rotary body 8 to form a through-hole of the rotary body 8. The fluid passage 9 has its axially inner end portion open to the concave portion 2, and communicates with the fluid passage 6 of the casing 1 through a clearance 2a of the concave portion 2. In operation, a part 11 of an outer peripheral surface of the rotary body 8 serves as an inner race of a sliding bearing, and is therefore hereinafter referred to as the corrsesponding inner race portion 11. In this case, it is not necessary to have the corresponding inner race portion 11 subjected to a specific treatment.

FIG. 1 shows the sliding bearing provided with a pair of outer races 10, each of which assumes a doughnut-like (i.e., annular) shape and is rotatably mounted on the corresponding inner race portion 11 of the rotary body 8. As is clear from FIG. 1, axially interposed between these corresponding inner race portions 11 is a large-diameter portion 8a of the rotary body 8. The rotary body 8 thus assembled with the outer races 10 of the sliding bearing is then inserted into the housing 3 from an axially inner side of the housing 3. After that, a pin 12 is pounded into the outer races 10 and the housing 3 to prevent the outer races 10 from rotating relative to the housing 3 in operation.

Then, the housing 3 has its axially inner surface abut against the corresonding axially inner surface of the casing 1, and is fixedly mounted on the casing 1 by means of the bolt 4. In these assembly operations, an axially inner end portion of the rotary body 8 is deeply inserted into the concave portion 2 of the casing 1, and has its outer peripheral surface brought into sliding contact with an inner peripheral surface of the lip packing 7. At this time, an axially inner one of the outer races 10 of the sliding bearing has its axially inner side surface axially abut against the lip packing 7 to axially hold the lip packing 7 on the rotary body 8. Since the lip packing 7 makes sliding contact with the outer peripheral surface of the rotary body 8 as described above, the fluid received in the clearance 2a of the concave portion 2 of the casing 1 is prevented from flowing to the sliding bearing 10, 11.

Figure 2:
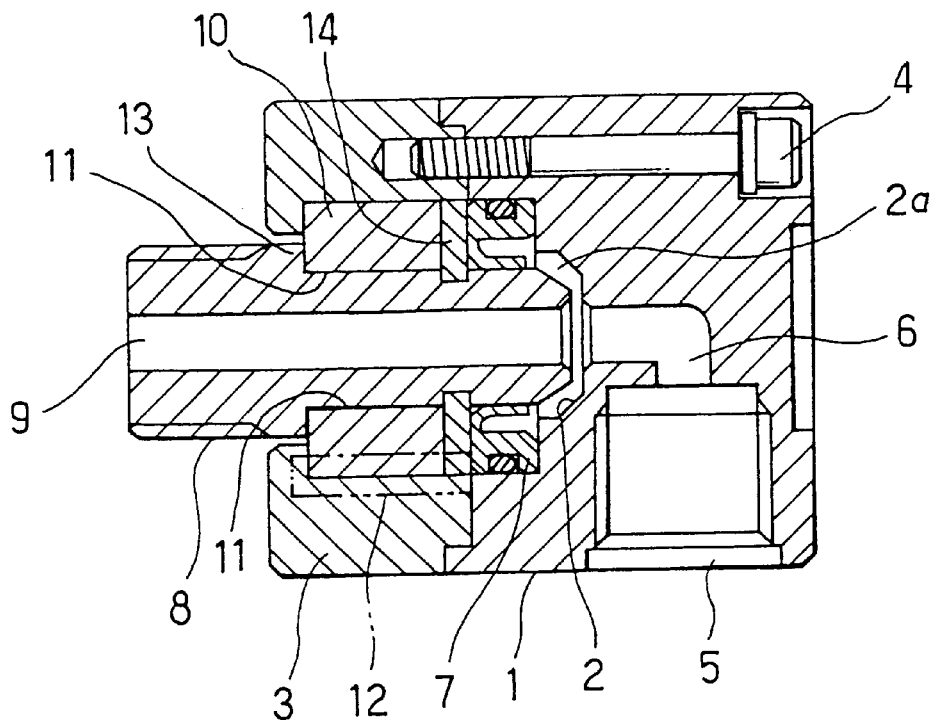
FIG. 2 is a longitudinal sectional view of a second embodiment of a rotary joint of the present invention.
Figure 3:
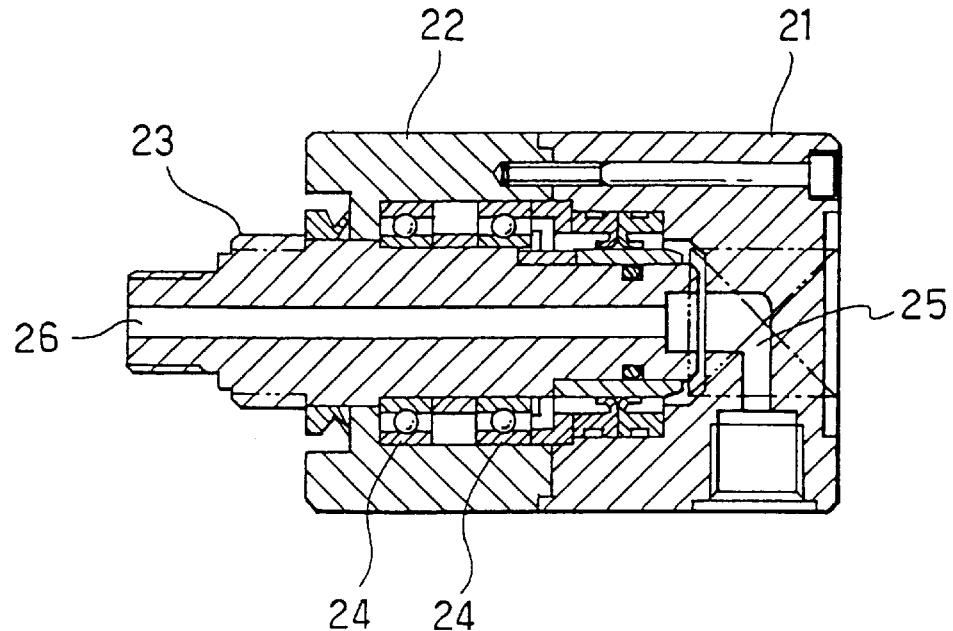
FIG. 3 is a longitudinal sectional view of one of the conventional rotary joints.
Figure 4:
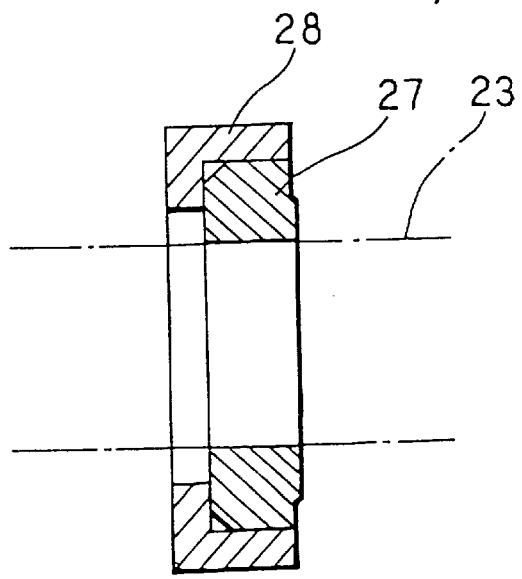
FIG. 4 is a longitudinal sectional view of another conventional bearing used in another conventional joint.

FIG. 2 shows a second embodiment of the rotary joint of the present invention having a construction in which: the sliding bearing 10, 11 shown in FIG. 2 is constructed of the outer race 10 and the corresponding inner race portion 11 of the rotary body 8; and, the outer race 10 assumes a sleeve-like shape. In this case, the rotary body 8 is provided with an annular shoulder portion 13, which 13 is axially located on the outer side of the corresponding inner race portion 11 of the rotary body 8, as shown in FIG. 2. In assembly operations, the rotary body 8 is inserted into the outer race 10 to have its shoulder portion 13 brought into contact with the outer race 10, so that the sliding beaing 10, 11 is formed. Then, an annular stopper member 14 is fixedly mounted in a corresponding annular groove of the outer peripheral surface of the rotary body 8 to prevent the outer race 10 from axially moving. Then, the rotary body 8 thus assembled with the outer race 10 and the stopper member 14 is inserted into the housing 3 from its axially inner side. Subsequent to the above, the pin 12 is pounded into the outer race 10 and and the housing 3 to prevent the outer race 10 from rotating relative to the housing 3 in operation.

Also in this case, as is in the first embodiment shown in FIG. 1, the housing 3 is fixedly mounted on the casing 1, so that the lip packing 7 is brought into sliding contact with the outer peripheral surface of the axially inner end portion of the rotary body 8. As shown in FIG. 2, the annular stopper member 14 is fitted to the annular groove of the axially inner end portion of the rotary body 8 to prevent the lip packing 7 from axially moving, so that the fluid received in the clearance 2a is isolated from the outer race 10 and the stopper member 14 in a fluid-tight manner by means of the lip packing 7.

In any of the first and the second embodiment of the present invention described above, the outer race 10 has its outer peripheral surface fixed to the housing 3 and its inner peripheral surface brought into sliding contact with the outer peripheral surface, i.e., the corresponding inner race portion 11 of the rotary body 8 to rotatably support the rotary body 8 in the joint main body of the rotary joint. In each of the embodiments, the bearing 10, 11 does not require any lubricating oil, and, therefore does not require any sealing means for holding the lubricating oil in fluid-tight manner.

The rotary joint of the present invention having the above construction has the following effect. Namely, the rotary joint of the present invention does not require any fastening operation of its inner race in mounting the inner race in the joint in contrast with the conventional joint, and, therefore does not require any cumbersome adjusting operation of the inner race. Further, since the rotary joint of the present invention does not require any sealing means for holding a lubricating oil in fluid-tight manner, the rotary joint is low in its component count, and, therefore easily assembled, which reduces the manufacturing and material costs, and further realizes easy maintenance.

What is claimed is:

1. In a rotary joint comprising:

a joint main body constructed of a casing and a housing including means to retain said casing and said housing in assembled relationship; and a rotary body of a machine inserted in said joint main body and rotatably mounted within both the casing and the housing for prolonged rotation in both, wherein a lip packing is engaged in the casing around the rotary body and communication fluid ducts passing through the rotary body and the casing; the improvement wherein: sail joint includes a sliding bearing and a part of a peripheral surface of said rotary body serves as a corresponding inner race of a sail sliding bearing; and said sliding bearing rotatably supports said rotary body, and constructed of said corresponding inner race and a corresponding outer race incorporated in said housing;

said lip packing being slidably engaged to both the rotary body and the casing;

wherein a pin is pounded into said rotary joint parallel to a longitudinal axis of the rotary body to engage both said outer race and said housing, whereby said outer race is prevented from rotating in operation;

wherein fluid flowing through said fluid ducts is prevented from reaching the sliding bearing.

2. The rotary joint as set forth in claim 1, wherein:

said sliding bearing is constructed of a plurality of units of thin-width sliding bearings each of which is engaged to an annular projection on the rotary body.

3. The rotary joint as set forth in claim 1, wherein: said sliding bearing is constructed of a single unit of a thick-width sliding bearing.

4. The rotary joint as set forth in claim 1, wherein the rotary body is made from a ceramic material.

5. The rotary joint as set forth in claim 1, wherein the rotary body is made from a fluorine plastic material.

6. The rotary joint as set forth in claim 1, wherein the lip packing is made from a fluorine plastic material.

* * * * *